US009030597B2

(12) United States Patent
Makigaki

(10) Patent No.: US 9,030,597 B2
(45) Date of Patent: May 12, 2015

(54) INTERCHANGEABLE LENS AND CAMERA BODY

(75) Inventor: Taro Makigaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 450 days.

(21) Appl. No.: 13/360,054

(22) Filed: Jan. 27, 2012

(65) Prior Publication Data

US 2012/0140110 A1    Jun. 7, 2012

Related U.S. Application Data

(63) Continuation-in-part of application No. 13/029,532, filed on Feb. 17, 2011.

(30) Foreign Application Priority Data

Sep. 30, 2010 (JP) ................................. 2010-221298
Jun. 7, 2011 (JP) ................................. 2011-127147

(51) Int. Cl.
 H04N 5/225  (2006.01)
 H04N 5/232  (2006.01)
 G03B 17/14  (2006.01)
 H04N 5/217  (2011.01)

(52) U.S. Cl.
 CPC ............ *H04N 5/23209* (2013.01); *G03B 17/14* (2013.01); *G03B 2206/00* (2013.01); *H04N 5/217* (2013.01); *H04N 5/23212* (2013.01); *H04N 5/23229* (2013.01)

(58) Field of Classification Search
 CPC ............................. H04N 5/2254; G02B 13/14
 USPC .................................... 348/360; 359/359, 354
 See application file for complete search history.

(56) References Cited

U.S. PATENT DOCUMENTS

| | | | | |
|---|---|---|---|---|
| 5,877,811 | A * | 3/1999 | Iijima et al. | 348/375 |
| 2004/0021783 | A1 | 2/2004 | Mihara | |
| 2004/0202464 | A1* | 10/2004 | Miyasaka et al. | 396/529 |
| 2009/0238553 | A1* | 9/2009 | Tamura | 396/296 |
| 2009/0296201 | A1* | 12/2009 | Caldwell | 359/354 |
| 2010/0271496 | A1* | 10/2010 | Obu | 348/208.4 |
| 2010/0328480 | A1* | 12/2010 | Kikuchi | 348/222.1 |
| 2011/0187874 | A1 | 8/2011 | Kikuchi | |
| 2011/0229118 | A1* | 9/2011 | Imafuji | 396/529 |
| 2013/0038749 | A1* | 2/2013 | Hatakeyama et al. | 348/222.1 |

(Continued)

FOREIGN PATENT DOCUMENTS

| | | |
|---|---|---|
| JP | A 2-053037 | 2/1990 |
| JP | A 5-264885 | 10/1993 |
| JP | A 9-130661 | 5/1997 |

(Continued)

OTHER PUBLICATIONS

Sep. 4, 2012 Office Action issued in Japanese Patent Application No. 2011-127147 (with translation).

*Primary Examiner* — Roberto Velez
*Assistant Examiner* — Cynthia Segura
(74) *Attorney, Agent, or Firm* — Oliff PLC

(57) ABSTRACT

An interchangeable lens including a fitting unit that can be fitted to and removed from a camera body; an imaging optical system that has an aperture, and whose focal length is variable over a range from a first focal length to a second focal length; and an MTF characteristic transmission unit that transmits MTF characteristic data specifying MTF characteristics of the imaging optical system to the camera body.

14 Claims, 5 Drawing Sheets

(56) References Cited

U.S. PATENT DOCUMENTS

| | | | |
|---|---|---|---|
| 2013/0050539 A1* | 2/2013 | Watanabe | 348/241 |
| 2013/0169849 A1* | 7/2013 | Kato et al. | 348/333.01 |

FOREIGN PATENT DOCUMENTS

| JP | A 2001-197354 | 7/2001 |
|---|---|---|
| JP | A 2002-209135 | 7/2002 |
| JP | A 2003-107331 | 4/2003 |
| JP | A 2003-259217 | 9/2003 |
| JP | A 2004-056362 | 2/2004 |
| JP | A 2004-328506 | 11/2004 |
| JP | A 2006-113468 | 4/2006 |
| JP | A 2008-092440 | 4/2008 |
| JP | A 2008-227996 | 9/2008 |
| JP | A 2009-159603 | 7/2009 |
| JP | A-2009-258307 | 11/2009 |
| JP | A 2009-282551 | 12/2009 |
| WO | WO 2010/067740 A1 | 6/2010 |

* cited by examiner

FIG.4

A: POSITION NEAR OPTICAL AXIS
B: INTERMEDIATE POSITION
C: POSITION AT EDGE OF PHOTOGRAPHIC FIELD

| | | 10 LINES PER mm | | | 20 LINES PER mm | | | 40 LINES PER mm | | | 80 LINES PER mm | | |
|---|---|---|---|---|---|---|---|---|---|---|---|---|---|
| | | A | B | C | A | B | C | A | B | C | A | B | C |
| FIRST FOCAL LENGTH (WIDE ANGLE END) | MAXIMUM APERTURE F VALUE | 249 | 245 | 232 | 241 | 231 | 193 | 224 | 192 | 123 | 187 | 116 | 80 |
| | F11 | 235 | 232 | 220 | 215 | 207 | 174 | 176 | 155 | 105 | 103 | 69 | 47 |
| INTERMEDIATE VALUE | MAXIMUM APERTURE F VALUE | 249 | 245 | 232 | 241 | 231 | 193 | 224 | 192 | 123 | 187 | 116 | 80 |
| | F11 | 235 | 232 | 220 | 215 | 207 | 174 | 176 | 155 | 105 | 103 | 69 | 47 |
| SECOND FOCAL LENGTH (TELEPHOTO END) | MAXIMUM APERTURE F VALUE | 249 | 245 | 232 | 241 | 231 | 193 | 224 | 192 | 123 | 187 | 116 | 80 |
| | F11 | 235 | 232 | 220 | 215 | 207 | 174 | 176 | 155 | 105 | 103 | 69 | 47 |

FIG.5

A: POSITION NEAR OPTICAL AXIS
B: INTERMEDIATE POSITION
C: POSITION AT EDGE OF PHOTOGRAPHIC FIELD

| | | 10 LINES PER mm | | | 20 LINES PER mm | | | 40 LINES PER mm | | | 80 LINES PER mm | | |
|---|---|---|---|---|---|---|---|---|---|---|---|---|---|
| | | A | B | C | A | B | C | A | B | C | A | B | C |
| FIRST FOCAL LENGTH (WIDE ANGLE END) | MAXIMUM APERTURE F VALUE | 0.97 | 0.97 | 0.83 | 0.90 | 0.90 | 0.48 | 0.83 | 0.82 | 0.31 | 0.80 | 0.78 | 0.20 |
| | F11 | 0.93 | 0.93 | 0.92 | 0.82 | 0.81 | 0.77 | 0.71 | 0.69 | 0.61 | 0.66 | 0.64 | 0.54 |
| INTERMEDIATE VALUE | MAXIMUM APERTURE F VALUE | 0.96 | 0.95 | 0.92 | 0.85 | 0.86 | 0.81 | 0.75 | 0.77 | 0.70 | 0.70 | 0.73 | 0.65 |
| | F11 | 0.92 | 0.92 | 0.92 | 0.82 | 0.82 | 0.81 | 0.71 | 0.70 | 0.69 | 0.86 | 0.64 | 0.63 |
| SECOND FOCAL LENGTH (TELEPHOTO END) | MAXIMUM APERTURE F VALUE | 0.96 | 0.95 | 0.90 | 0.86 | 0.86 | 0.81 | 0.77 | 0.77 | 0.71 | 0.72 | 0.73 | 0.67 |
| | F11 | 0.97 | 0.96 | 0.92 | 0.90 | 0.86 | 0.74 | 0.84 | 0.77 | 0.55 | 0.80 | 0.72 | 0.46 |

INTERCHANGEABLE LENS AND CAMERA BODY

This application is a continuation in part of U.S. patent application Ser. No. 13/029,532 filed Feb. 17, 2011. The disclosures of the following U.S. patent application and priority applications are herein incorporated by reference: U.S. patent application Ser. No. 13/029,532 filed Feb. 17, 2011; Japanese Patent Application No. 2010-221298 filed Sep. 30, 2010; and Japanese Patent Application No. 2011-127147 filed Jun. 7, 2011.

BACKGROUND OF THE INVENTION

1. Field of the Invention

The present invention relates to an interchangeable lens and to a camera body.

2. Description of Related Art

With a camera system of the interchangeable lens type, sometimes it is the case that optical characteristics and so on of the lens are stored in advance on the interchangeable lens side. The camera body refers to these optical characteristics and so on, and performs appropriate control for each of the interchangeable lenses. For example, with the digital camera system described in Japanese Laid-Open Patent Publication 2009-258307, a large number of items of MTF information are recorded in the lens unit. With this digital camera system, the camera main body gathers the MTF information from the lens unit, and employs this information for calculation of an HPF cutoff frequency and so on.

SUMMARY OF THE INVENTION

With the digital camera system described in Japanese Laid-Open Patent Publication 2009-258307, there is the problem that dealing with the MTF information involves the handling of a large quantity of data.

According to the 1st aspect of the present invention, an interchangeable lens, comprises: a fitting unit that can be fitted to and removed from a camera body; an imaging optical system that has an aperture, and whose focal length is variable over a range from a first focal length to a second focal length; and an MTF characteristic transmission unit that transmits MTF characteristic data specifying MTF characteristics of the imaging optical system to the camera body. And: the MTF characteristic data is a plurality of MTF values each corresponding to a combination of three focal lengths, two aperture F values, and three image height positions; the three focal lengths are the first focal length, the second focal length, and a focal length intermediate between the first focal length and the second focal length; the two F values are a maximum aperture F value of the imaging optical system and an F value other than the maximum aperture F value; and the three image height positions are a position in a neighborhood of an optical axis of the imaging optical system, a position at an edge of a photographic field of the imaging optical system, and an intermediate position between the position in the neighborhood of the optical axis and the position at the edge of the photographic field.

According to the 2nd aspect of the present invention, in the interchangeable lens according to the 1st aspect, it is preferred that the F value other than the maximum aperture F value is F11.

According to the 3rd aspect of the present invention, in the interchangeable lens according to the 1st aspect, it is preferred that: the MTF characteristic data is a plurality of MTF values each corresponding to a combination of the three focal lengths, the two F values, the three image height positions, and four spatial frequencies; and the four spatial frequencies are 10 lines per mm, 20 lines per mm, 40 lines per mm, and 80 lines per mm.

According to the 4th aspect of the present invention, in the interchangeable lens according to the 1st aspect, it is preferred that: the interchangeable lens further comprises a focusing lens whose driven state changes, and a driven state transmission unit that transmits the driven state of the focusing lens to the camera body via a first transmission path; and the MTF characteristic transmission unit transmits the MTF characteristic data to the camera body via a second transmission path that is different from the first transmission path.

According to the 5th aspect of the present invention, in the interchangeable lens according to the 4th aspect, it is preferred that the MTF characteristic transmission unit transmits the MTF characteristic data to the camera body on a cycle that corresponds to an image output cycle of an image sensor provided in the camera body.

According to the 6th aspect of the present invention, in the interchangeable lens according to the 1st aspect, it is preferred that: the first focal length and the second focal length are the same focal length; and the MTF characteristic data has the same MTF values for each of the three focal lengths.

According to the 7th aspect of the present invention, an interchangeable lens, comprises: a fitting unit that can be fitted to and removed from a camera body; an imaging optical system that has an aperture; and an MTF characteristic transmission unit that transmits MTF characteristic data specifying MTF characteristics of the imaging optical system to the camera body. And: the MTF characteristic data is a plurality of MTF values each corresponding to a combination of three focal lengths, two aperture F values, and three image height positions; the two F values are a first F value near a maximum aperture F value of the imaging optical system and a second F value different from the first F value; and the three image height positions are different from each other.

According to the 8th aspect of the present invention, in the interchangeable lens according to the 7th aspect, it is preferred that: the imaging optical system is configured so that a focal length is variable; and the three focal lengths are different from each other.

According to the 9th aspect of the present invention, in the interchangeable lens according to the 8th aspect, it is preferred that: the imaging optical system is configured so that the focal length is variable over a range from a first focal length to a second focal length that is larger than the first focal length; and the three focal lengths are the first focal length, the second focal length, and a third focal length that is larger than the first focal length and smaller than the second focal length.

According to the 10th aspect of the present invention, in the interchangeable lens according to the 7th aspect, it is preferred that: the imaging optical system is configured so that a focal length is fixed to a predetermined focal length; each of the three focal lengths is the predetermined focal length.

According to the 11th aspect of the present invention, in the interchangeable lens according to the 7th aspect, it is preferred that the second F value is F11.

According to the 12th aspect of the present invention, in the interchangeable lens according to the 7th aspect, it is preferred that two of the three image height positions are a position in a neighborhood of an optical axis of the imaging optical system and a position near an edge of a photographic field of the imaging optical system.

According to the 13th aspect of the present invention, in the interchangeable lens according to the 7th aspect, it is preferred that the MTF characteristic transmission unit transmits the MTF characteristic data corresponding to a spatial frequencies of 10 lines per mm, the MTF characteristic data corresponding to a spatial frequencies of 20 lines per mm, the MTF characteristic data corresponding to a spatial frequencies of 40 lines per mm, and the MTF characteristic data corresponding to a spatial frequencies of 80 lines per mm, to the camera body.

According to the 14th aspect of the present invention, in the interchangeable lens according to the 7th aspect, it is preferred that: the interchangeable lens further comprises a focusing lens whose driven state changes, and a driven state transmission unit that transmits the driven state of the focusing lens to the camera body via a first transmission path; and the MTF characteristic transmission unit transmits the MTF characteristic data to the camera body via a second transmission path that is different from the first transmission path.

According to the 15th aspect of the present invention, in the interchangeable lens according to the 7th aspect, it is preferred that the MTF characteristic transmission unit transmits the MTF characteristic data to the camera body on a cycle that corresponds to an image output cycle of an image sensor provided in the camera body.

According to the 16th aspect of the present invention, a camera body comprises: a fitting unit that an interchangeable lens according to the 1st aspect can be fitted to and removed from; an MTF characteristic reception unit that receives the MTF characteristic data from the interchangeable lens; an image-capturing unit that captures an image of a photographic subject and outputs an image capture signal; and an image processing unit that performs at least one of edge enhancement processing and contrast enhancement processing upon the image capture signal, at an intensity based upon the MTF characteristic data.

BRIEF DESCRIPTION OF THE DRAWINGS

FIG. 4 is a figure showing the structure of MTF characteristic data of the first embodiment.

FIG. 5 is a figure showing the structure of MTF characteristic data the second embodiment.

DESCRIPTION OF THE PREFERRED EMBODIMENTS

Embodiment 1

Figure 1:
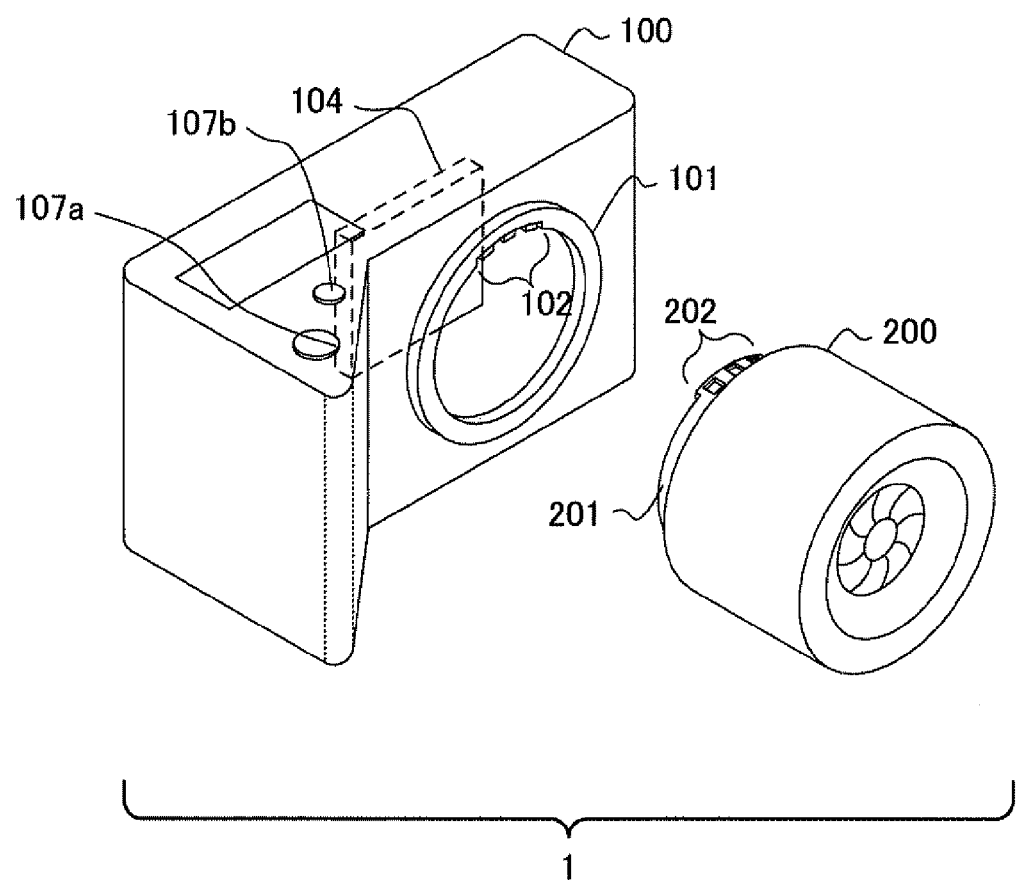
FIG. 1 is a perspective view showing an interchangeable lens type camera system to which the present invention is applied.

FIG. 1 is a perspective view showing an interchangeable lens type camera system to which the present invention is applied. It should be understood that, in FIG. 1, only devices and mechanisms related to the present invention are shown; other devices and mechanisms will neither be shown nor explained. This camera 1 includes a camera body 100 and an interchangeable lens 200 that can be fitted to the camera body 100 and removed therefrom. The interchangeable lens 200 is a so called zoom lens whose focal length can be changed by actuation of a zoom ring not shown in the figures.

A lens mount 101 is provided to the camera body 100, and is adapted for the interchangeable lens 200 to be fitted to this lens mount 100 and removed therefrom. Moreover, a lens mount 201 is provided to the interchangeable lens 200 and corresponds to the body side lens mount 101, so that the interchangeable lens 200 can be fitted to the camera body 100. When the interchangeable lens 200 is installed, a contact point group 102 that is provided upon the body side lens mount 101 and includes a plurality of contact points comes into contact with and is connected to a contact point group 202 that is provided upon the lens side lens mount 201 and similarly includes a plurality of contact points. The contact point groups 102 and 202 are utilized for providing supply of electrical power from the camera body 100 to the interchangeable lens 200, and for transmission and reception of signals between the camera body 100 and the interchangeable lens 200.

An image sensor (image-capturing unit) 104 that captures an image of a photographic subject and outputs an image capture signal is provided behind the lens mount 101, within the camera body 100. And buttons 17a and 17b, that constitute input devices, are provided on the upper portion of the camera body 100. Using these buttons 17a and 17, the user is able to issue commands for photography to the camera body 100, and to set photographic conditions and so on.

Figure 2:
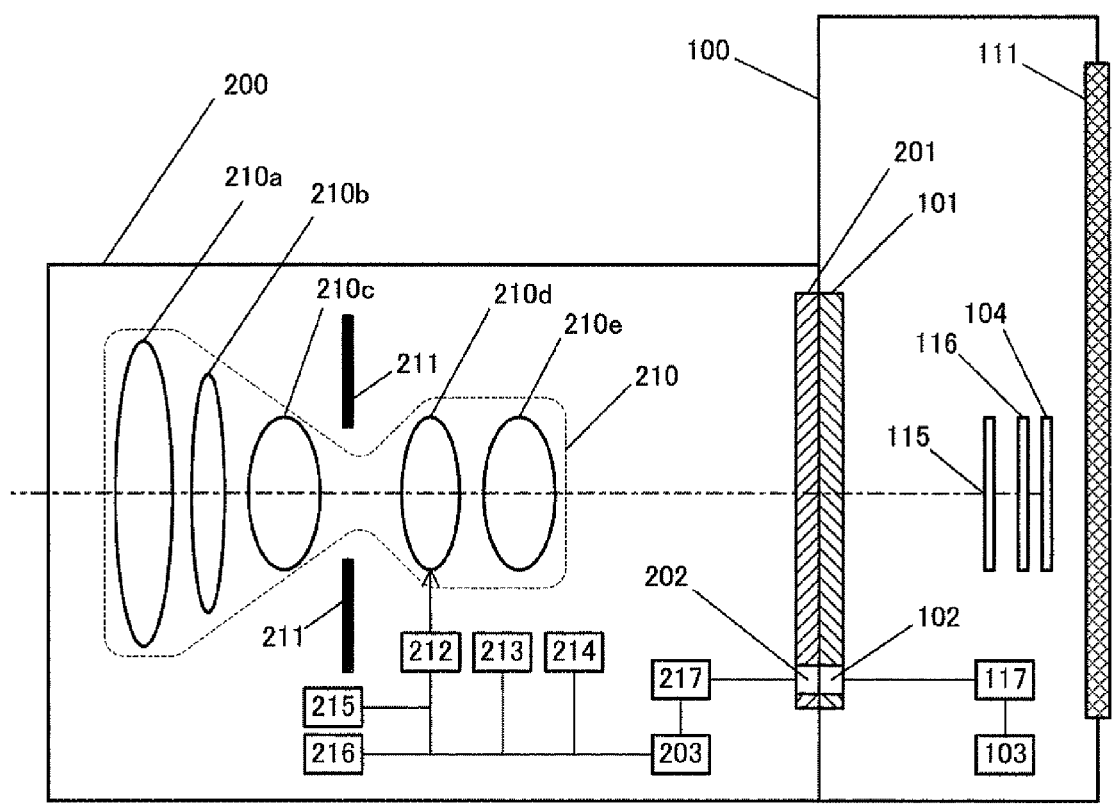
FIG. 2 is a sectional view showing this interchangeable lens type camera system.

FIG. 2 is a sectional view showing this interchangeable lens type camera system to which the present invention is applied. The interchangeable lens 200 includes an imaging optical system 210 that forms an image of the photographic subject. And this imaging optical system 210 includes an aperture 211. Moreover, the imaging optical system 210 includes a plurality of lenses 210a through 210e. Among this plurality of lenses 210a through 210e, a focusing lens 210d is provided for controlling the position along the optical axis at which the image of the photographic subject is focused. The imaging optical system 210 is built so that its focal length can be varied in a range from a first focal length to a second focal length, according to rotation of a zoom ring not shown in the figures.

A lens side control unit 203 that supervises control of the various sections of the interchangeable lens 200 is provided internally to the interchangeable lens 200. This lens side control unit 203 includes a microcomputer and peripheral circuitry and so on thereof, not shown in the figures. A lens side transmission and reception unit 217, a lens drive unit 212, a lens position detection unit 213, a focal length detection unit 214, a ROM 215, and a RAM 216 are connected to the lens side control unit 203.

The lens side transmission and reception unit 217 can transmit and receive signals to and from the camera body 100 via the contact point groups 102 and 202. It should be understood that, in the following explanation, sometimes control of the lens side transmission and reception unit 217 by the lens side control unit 203 so as to transmit data to the camera body 100 via the contact point groups 102 and 202 is expressed as "the lens side control unit 203 transmits data to the camera body 100". The same holds for reception of data.

The lens drive unit 212 includes an actuator such as, for example, a stepping motor or the like, and this actuator drives the focusing lens 210d. In other words, by the focusing lens 210d being driven by the lens drive unit 212, its driven state (i.e. the position of the focusing lens 210d) is changed. The lens position detection unit 213 detects the position of the focusing lens 210d by, for example, counting the number of pulses of the signal inputted to the stepping motor incorporated in the lens drive unit 212, and outputs a lens position signal. Or it would also be acceptable to detect the position of the focusing lens 210d by using a per se known type of distance encoder or the like, provided to the interchangeable lens 200. And the focal length detection unit 214 detects the focal length of the imaging optical system 210 using, for example, a zoom encoder or the like, and outputs a focal length signal.

The ROM 215 is a non-volatile storage medium, and stores in advance a predetermined control program that is executed by the lens side control unit 203, and also MTF (Modulation Transfer Function) characteristic data that will be described hereinafter. And the RAM 216 is a volatile storage medium, and is utilized by the lens side control unit 203 as a storage region for various types of data.

A shutter 115 and a filter 116 are provided in front of the image sensor 104. Light from the photographic subject that has passed through the imaging optical system 210 is incident upon the image sensor 104 via the shutter 115 and the filter 116. The shutter 115 controls the state of exposure of the image sensor 104. And the filter 116 is an optical filter consisting of a combination of an optical low pass filter and an infrared radiation cutoff filter.

A body side control unit 103 that supervises control of the various sections of the camera body 100 is provided internally to the camera body 100. This body side control unit 103 includes a microcomputer and peripheral circuitry and so on thereof, not shown in the figures. A body side transmission and reception unit 117 is connected to the body side control unit 103. This body side transmission and reception unit 117 is connected to the contact point group 102, and is capable of transmitting and receiving signals to and from the lens side transmission and reception unit 217 via this contact point group 102. It should be understood that, in the following explanation, sometimes control of the body side transmission and reception unit 117 by the body side control unit 103 so as to transmit data to the interchangeable lens 200 via the contact point groups 102 and 202 is expressed as "the body side control unit 103 transmits data to the interchangeable lens 200". The same holds for reception of data.

A display device 111 that consists of an LCD panel or the like is mounted on the rear surface of the camera body 100. In this embodiment, the image output cycle of this image sensor 104 is 60 frames per second (approximately one frame every 16 milliseconds), in order for display of a so called through image (live view image) to be possible. In other words, the image capture signal outputted from the image sensor 104 is inputted to the body side control unit 103 sixty times in each second. And the body side control unit 103 displays an image of the photographic subject based upon this image capture signal upon the display device 111 sixty times in each second. It should be understood that, apart from this through image, also menu screens of various types for setting photographic conditions and so on may be displayed upon the display device 111.

<Explanation of the Automatic Focus Adjustment>

The body side control unit 103 is adapted to perform automatic focus adjustment processing of a per se known type. This automatic focus adjustment processing includes focus detection processing in which the current focus adjustment state is detected, and focus adjustment processing in which the focusing lens 210d is driven according to the result of this detection so as to perform focus adjustment. The body side control unit 103 is adapted to be able to perform either of two different types of focus detection processing in this automatic focus adjustment processing. In concrete terms, the body side control unit 103 can perform either focus detection processing using a so called photographic image surface phase difference detection method, or focus detection processing according to a so called contrast detection method. The body side control unit 103 uses one or the other of these two types of focus detection processing, according to the conditions of photography and the characteristics of the photographic subject and so on.

Now the focus detection processing performed by the body side control unit 103 according to the photographic image surface phase difference detection method will be explained. The image sensor 104 of this embodiment has specific pixels for focus detection. These pixels for focus detection are similar to those described in Japanese Laid-Open Patent Publication 2007-317951. And the body side control unit 103 performs focus detection processing by performing per se known phase difference detection (phase detection) using the pixel output data from these pixels for focus detection. It should be understood that, since this calculation for phase difference detection is similar to that described in, for example, Japanese Laid-Open Patent Publication 2007-317951, accordingly description thereof will here be omitted. The body side control unit 103 performs automatic focus adjustment by driving the focusing lens 210d on the basis of a defocus amount that is obtained by this focus detection processing.

And now the focus detection processing performed by the body side control unit 103 according to the contrast detection method will be explained. The body side control unit 103 calculates a focus evaluation value (i.e. a contrast value) by performing a per se known contrast detection calculation based upon a so called hill climbing method, using the pixel output data from the image capture pixels included in the image sensor 104. And the body side control unit 103 performs this contrast detection calculation while driving the focusing lens 210d within a range that will be described hereinafter, and performs automatic focus adjustment by detecting the position at which this focus evaluation value reaches its peak.

<Explanation of the Data Communication>

Figure 3:
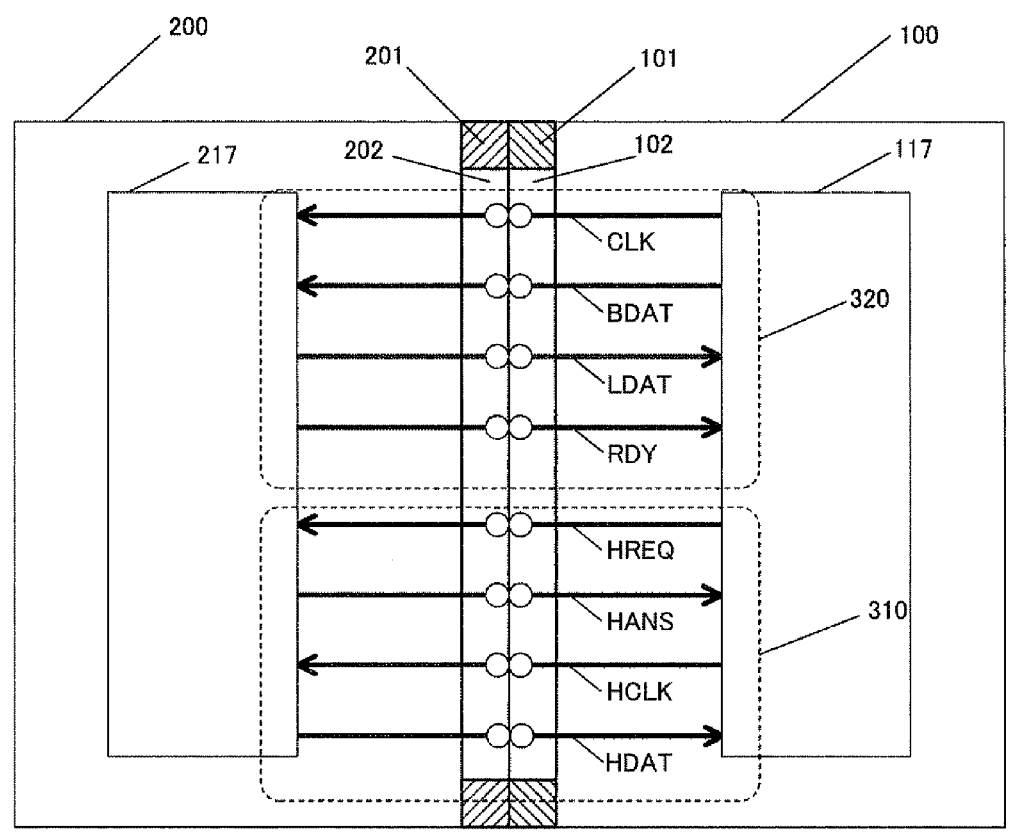
FIG. 3 is a schematic figure showing the details of contact point groups 102 and 202.

FIG. 3 is a schematic figure showing the details of the contact point groups 102 and 202. As shown in FIG. 3, each of the contact point groups 102 and 202 has eight contact points for performing signal transmission and reception. In other words, eight signal lines are present between the camera body 100 and the interchangeable lens 200, each corresponding to a pair of these contact points. It should be understood that, apart from these contact points, the contact point groups 102 and 202 also have contact points and so on for performing power supply from the camera body 100 to the interchangeable lens 200 and so on, but these are not shown in the figure and explanation thereof will be omitted. In the following, as shown in FIG. 3, these eight signal lines will be termed HCLK, HREQ, HANS, HDAT, CLK, RDY, BDAT, and LDAT.

Of the eight signal lines described above, the signal lines HCLK, HREQ, HANS, and HDAT constitute a first transmission path 310. In a similar manner, the signal lines CLK, RDY, BDAT, and LDAT constitute a second transmission path 320. In the following, these two transmission paths will be explained.

The lens side control unit 203 transmits lens position data that specifies the position of the focusing lens 210d (in other words, the driven state of the focusing lens 210d) to the camera body 100 via the first transmission path 310. And the body side control unit 103 changes the signal level of HREQ on a predetermined cycle (having a period, for example, of one millisecond). The lens side control unit 203 starts processing to prepare for communication according to this change of the signal level of HREQ. In concrete terms, this communication preparation processing is processing for detection of the position of the focusing lens 210d using the lens position detection unit 213, and processing for preparation of lens position data for transmission to the camera body 100.

When the communication preparation processing is completed, the lens side control unit 203 changes the signal level of HANS. In response to this change of the signal level of HANS, the body side transmission and reception unit 117 outputs a clock signal to HCLK. And the lens side transmission and reception unit 217 outputs the lens position data to HDAT in synchrony with this clock signal.

The second transmission path 320 is used for transfer between the camera body 100 and the interchangeable lens 200 of various types of data other than lens position data (for example, data giving control commands to the interchangeable lens 200, and data specifying characteristics of the interchangeable lens 200). This second transmission path is a full duplex transmission path. In other words, it can be used for performing transmission of data from the camera body 100 to the interchangeable lens 200, simultaneously with being used for performing transmission of data from the interchangeable lens 200 to the camera body.

When it is necessary to perform communication using this second transmission path 320, the body side control unit 103 controls the body side transmission and reception unit 117 to output a clock signal to CLK. At this time, the body side transmission and reception unit 117 outputs the data that is to be the subject of transmission to BDAT in synchrony with this clock signal. On the other side, the lens side transmission and reception unit 217 outputs data that is to be the subject of transmission to LDAT, also in synchrony with this clock signal. It should be understood that the lens side transmission and reception unit 217 changes the signal level of RDY in one direction if it is possible to transmit and receive data, and in the other direction if it is not possible to do so. For example, if the lens side transmission and reception unit 217 is in a state in which it cannot transmit or receive data, then it may bring the signal level of RDY to H, while if it is in a state in which it can transmit or receive data, then it may bring the signal level of RDY to L. The body side transmission and reception unit 117 checks the signal level of RDY before starting communication, and does not perform communication if the lens side transmission and reception unit 217 is in a state in which it cannot transmit or receive data.

The body side control unit 103 uses the second transmission path 320 explained above for transmitting control command data specifying various types of control command to the interchangeable lens 200. Examples of such control command data are control command data for shifting the focusing lens 210d in the infinity direction by a specified number of pulses (for example by ten pulses), control command data for closing the aperture 211 by a specified number of steps (for example by two steps), and so on.

Apart from the data that the body side control unit 103 transmits using the second transmission path 320, there is also request data in which various types of information are requested from the interchangeable lens 200. Examples of such request data are, for example, request data that requests data specifying the current focal length of the imaging optical system 210, request data that requests data specifying the current aperture value of the aperture 211, and so on. When the lens side control unit 203 receives the request data described above, it transmits corresponding data to the body side control unit 103 via the second transmission path 320.

It should be understood that the time period that is required for the body side control unit 103 to receive any signal from the lens side control unit 203 using the second transmission path 320 described above is long, as compared to the time period that is required for lens position data to be received using the first transmission path 310. This is because, on the second transmission path 320, it is first necessary for request data describing the specific information being requested to be transmitted to the lens side control unit 203 using CLK and BDAT, as opposed to the case with the first transmission path 310, for which the request to the lens side control unit 203 for data is transmitted by only changing the signal level of HREQ.

<Explanation of the MTF Characteristic Data>

The lens side control unit 203 of this embodiment transmits to the camera body 100 MTF characteristic data specifying the MTF characteristics of the imaging optical system 210. As previously described, this MTF characteristic data is stored in advance in the ROM 215. In the following, this MTF characteristic data will be explained.

FIG. 4 is a figure showing the structure of the MTF characteristic data. In this embodiment, the MTF characteristic data 10 includes a plurality of MTF values 11, each corresponding to a combination of one of three focal lengths 12, one of two F values 13, one of three image height positions (amounts of axial deviation) 14, and one of four spatial frequencies 15. It should be noted that while in FIG. 4 the same MTF values are indicated in each of the three focal lengths 12, different MTF values 11 are stored in correspondence to each of the three focal lengths 12 in actual MTF characteristics data since the MTF characteristics of the imaging optical system 210 normally vary according to focal length.

The three focal lengths 12 for which the MTF characteristic data 10 are defined are the focal length at the wide angle end of the zoom range of the interchangeable lens 200, the focal length at the telephoto end thereof, and a focal length value intermediate between these two. In other words, these three focal lengths 12 are a first focal length, a second focal length, and an intermediate value between this first focal length and this second focal length. For example, if the interchangeable lens 200 is a zoom lens whose focal length is variable in the range 80 mm to 300 min, then these three focal lengths may be 80 mm, 300 mm, and 190 mm.

The two F values 13 for which the MTF characteristic data 10 are defined are the F value of the imaging optical system 210 at its maximum aperture, and a F value that is different from this maximum aperture F value. It should be understood that, in this embodiment, the "F value that is different from the maximum aperture F value" mentioned above is F11. This F value of F11 is an F value near the minimum opening of which the aperture 211 is capable. With the camera system 1 of this embodiment, all of the interchangeable lenses 200 that can be fitted to the camera body 100 are interchangeable lenses that can be set to an aperture of at least F11.

The three image height positions for which the MTF characteristic data 10 are defined are a position in the neighborhood of the optical axis of the imaging optical system 210, a position at the edge of the photographic field (the end of the angle of view) of the imaging optical system 210, and a position intermediate between these two positions. And the four spatial frequencies 15 for which the MTF characteristic data 10 are defined are 10 lines per mm, 20 lines per mm, 40 lines per mm, and 80 lines per mm.

Since 3 (the number of focal lengths)×2 (the number of F values)×3 (the number of image height positions)×4 (the number of spatial frequencies)=72, the MTF characteristic data 10 consists of 72 items 11 of MTF information. Each of these items 11 of MTF information is a one byte no-sign integer from 0 to 255 that corresponds to a value from 0.0 to 1.0 of MTF value of the imaging optical system 210 in the specified circumstances, and is represented by. In other words, the actual MTF value in each case is to be calculated by dividing the MTF value 11 by 255. For example, if the MTF value 11 in the table of FIG. 4 corresponding to the combination of a focal length of 80 mm, an F value of 1.4 (aperture value), an image height positioned in the neighborhood of the optical axis, and a spatial frequency of 10 lines per mm is 100, then the MTF value for the imaging optical system 210 in this case is around 0.39.

It should be understood that, if an MTF value 11 is needed that corresponds to none of the three focal lengths 12 in the MTF characteristic data 10, then the body side control unit 103 may calculate an appropriate MTF value 11 by performing an interpolation calculation using the MTF values 11 corresponding to the above three focal lengths 12. The body side control unit 103 may also perform an interpolation calculation for the aperture opening amount, in a similar manner.

The number of MTF values 11 that make up the MTF characteristic data 10 should be as few as possible, from the point of view of reducing the required capacity of the ROM 215 and the required communication time and so on. With the MTF characteristic data 10 of this embodiment, the reason for only two F value steps being provided is in order to prevent the size of the MTF characteristic data 10 from becoming too great due to increase of the number of MTF values 11. Generally, the MTF value of the imaging optical system 210 decreases, the larger is the F value, in other words, the more the aperture 211 is closed down. Accordingly two divisions of F value are sufficient, and it will be acceptable to perform interpolation calculation for deriving MTF values that correspond to other F values.

On the other hand, with the MTF characteristic data 10 of this embodiment, the number of divisions of focal length is three. This is because, in contrast to the situation with F value, a minimum of three points are required for maintaining the accuracy of interpolation calculation, unless the MTF value is at a peak at the wide angle end or at the telephoto end (since, at the focal length section at the center, the MTF value may be characteristic data having a hill shape that constitutes a peak or having a valley shape that constitutes a trough).

Moreover, with the MTF characteristic data 10 of this embodiment, the number of divisions of image height is three. This is because some imaging optical systems exist with which, for example, while the MTF value is greatest in the neighborhood of the optical axis, the MTF value decreases abruptly at a certain distance away from the optical axis. In the case of an interchangeable lens 200 having this type of imaging optical system 210, if MTF values at a minimum of three points are not available, it is not possible to perform the interpolation calculation with good accuracy.

Yet further, with the MTF characteristic data 10 of this embodiment, the number of divisions of spatial frequency 15 is four, i.e. 10 lines per mm, 20 lines per mm, 40 lines per mm, and 80 lines per mm, and this is for the following reason. In this embodiment, the MTF value 11 that corresponds to the spatial frequency of 10 lines per mm is used in contrast enhancement processing by the body side control unit 103 (to be described hereinafter). Moreover, the MTF value 11 that corresponds to the spatial frequency of 40 lines per mm is used in edge enhancement processing by the body side control unit 103 (also to be described hereinafter). However, there is a possibility that the interchangeable lens 200 may be fitted to several camera bodies 100 of a plurality of types and having image sensors 104 of different pixel pitches. If in the future a camera body 100 should appear on the market equipped with an image sensor 104 that has a smaller pixel pitch, then there is a possibility that an MTF value 11 corresponding to a spatial frequency of 10 lines per mm and an MTF value 11 corresponding to a spatial frequency of 40 lines per mm will not be adequate for contrast enhancement processing and for edge enhancement (contour enhancement) processing, respectively. Thus, in this embodiment, MTF values 11 corresponding to spatial frequencies of 10 lines per mm and 40 lines per mm are provided for an image sensor 104 that has relatively large pixel pitch, while MTF values 11 corresponding to spatial frequencies of 20 lines per mm and 80 lines per mm are provided for an image sensor 104 that has relatively small pixel pitch.

In other words, with the MTF characteristic data 10 of this embodiment, two different pairs consisting of an MTF value 11 that corresponds to spatial frequency for contrast enhancement processing and an MTF value 11 that corresponds to spatial frequency for edge enhancement processing are included, respectively directed at two different types of camera body 100 having image sensors 104 of different pixel pitches.

By setting the numbers of divisions of the various factors in this manner, along with keeping the amount of data in the MTF characteristic data 10 as low as possible, it also becomes possible to maintain sufficient accuracy from the points of view of contrast enhancement processing and edge enhancement processing.

During the initial communication, the body side control unit 103 requests the interchangeable lens 200 to send its MTF characteristic data 10 via the second transmission path 320. And, upon receipt of this request, the lens side control unit 203 transmits the MTF characteristic data stored in the ROM 215 to the camera body 100 via the second transmission path 320.

It should be understood that the initial communication here means, for example, communication executed by the body side control unit 103 and by the lens side control unit 203 when the power supply switch of the camera body 100 is turned from OFF to ON, or when the interchangeable lens 200 is first fitted to the camera body 100. In this initial communication, the body side control unit 103 and the lens side control unit 203 perform interchange of data specifying the characteristics of the imaging optical system 210 and of data specifying the characteristics of the camera body 100.

The body side control unit 103 stores the MTF characteristic data 10 that it has received in a RAM not shown in the figures. And, on the basis of this MTF characteristic data 10, edge enhancement processing and contrast enhancement processing that will be described hereinafter are performed upon the image capture signal outputted from the image sensor 104.

<Explanation of the Edge Enhancement Processing and the Contrast Enhancement Processing>

Before edge enhancement processing or contrast enhancement processing, the body side control unit 103 receives from the interchangeable lens 200 the focal length of the imaging optical system 210 and the aperture value of the aperture 211 during image capture. And the MTF values 11 corresponding to the focal length and aperture value that have been received are extracted from the MTF characteristic data 10.

It should be understood that, if the focal length received from the interchangeable lens 200 does not agree with any one of the three focal lengths 12 in the MTF characteristic data 10, then the body side control unit 103 calculates an appropriate MTF value 11 by performing interpolation calculation as previously described. The same holds for the aperture value.

Then the body side control unit 103 directs attention, among the MTF values that have been extracted, to the MTF value 11 corresponding to the image height position close to the optical axis and corresponding to the spatial frequency of 10 lines per mm. And if this MTF value 11 is less than or equal to a predetermined threshold value (for example 153), then per se known contrast enhancement processing is performed upon that region, within the entire photographic field, that is in the vicinity of the optical axis. In this contrast enhancement processing, for example, edge enhancement processing at a somewhat larger radius could be performed, and tone correction according to a tone curve could also be performed. Moreover, so called local contrast enhancement processing could also be performed, by performing contrast enhancement locally upon a partial portion of the above region.

The body side control unit 103 repeats the above contrast enhancement processing upon each of the region in the neighborhood of the optical axis, the region near the edge of the photographic field, and the region in between those two regions. The MTF values 11 that are used at this time are, naturally, the appropriate MTF values 11 that correspond to the image height positions of those regions.

After the contrast enhancement processing, the body side control unit 103 performs the edge enhancement processing. In a similar manner to the contrast enhancement processing, in this edge enhancement processing, the body side control unit 103 subdivides the entire photographic field into three regions according to the angle of view, and performs processing upon each of those three regions. When performing this edge enhancement processing, the body side control unit 103 acquires the MTF value 11 that corresponds to a spatial frequency of 40 lines per mm. And if this MTF value 11 is less than or equal to a predetermined threshold value (for example 77), then the body side control unit 103 performs stronger edge enhancement, as compared to when this is not the case. Furthermore, if the F value during image capture is greater than a predetermined threshold value (for example F11), in other words if the aperture opening is smaller, then the body side control unit 103 performs stronger edge enhancement. Stronger edge enhancement is applied in this manner when the aperture opening is small, because the smaller is the aperture 211, the more is the limit of resolution due to the influence of diffraction reduced.

As described above, the body side control unit 103 performs edge enhancement processing and contrast enhancement processing upon the image capture signal at an intensity that is based upon the MTF characteristic data.

The camera system according to the first embodiment of the present invention as described above provides the following beneficial operational effects.

(1) The lens side control unit 203 transmits the MTF characteristic data 10 that specifies the MTF characteristics of the imaging optical system 210 to the camera body 100. This MTF characteristic data 10 is a plurality of MTF values 11 corresponding respectively to combinations of three focal lengths 12, two F values 13, and three image height positions 14: the three focal lengths 12 are a first focal length, a second focal length, and an intermediate value between the first focal length and the second focal length; the two F values 13 are the maximum aperture F value of the imaging optical system 210, and an F value other than that maximum aperture F value; and the three image height positions 14 are a position in the neighborhood of the optical axis of the imaging optical system 210, a position at the edge of the photographic field of the imaging optical system 210, and an intermediate position between the above position in the neighborhood of the optical axis and the above position at the edge of the photographic field. Since this is done, it is possible to reduce the amount of data in the MTF characteristic data.

(2) The two F values 13 are the maximum aperture F value of the imaging optical system 210, and F11. Since this is done, the number of values into which the F value in the MTF characteristic data 10 is divided is sufficiently small, and furthermore it becomes possible to reduce the amount of data in the MTF characteristic data.

(3) The MTF characteristic data 10 is a plurality of MTF values 11 that respectively correspond to combinations of one of three focal lengths 12, one of two F values 13, one of three image height positions 14, and one of four spatial frequencies 15, and the four spatial frequencies 15 are 10 lines per mm, 20 lines per mm, 40 lines per mm, and 80 lines per mm. Since this is done, even if in the figure a camera body 100 appears upon the market that has an image sensor whose pixel pitch is smaller than previously, the body side control unit 103 will still be capable of performing contrast enhancement processing and edge enhancement processing at sufficiently good accuracy.

(4) The lens side control unit 203 transmits the driven state of the focusing lens 210d to the camera body via the first transmission path 310, and also transmits the MTF characteristic data 10 to the camera body 100 via the second transmission path 320 that is different from the first transmission path 310. Since this is done, it is possible to transmit the MTF characteristic data 10 without exerting any influence upon the transmission by the lens side control unit 203 of the driven state of the focusing lens 210d.

(5) The camera body 100 includes the lens mount 101 to which the interchangeable lens 200 is removably attached, the body side control unit 103 that receives the MTF characteristic data from the interchangeable lens 200, and the image sensor 104 that captures an image of the photographic subject and outputs an image capture signal. And the body side control unit 103 performs the edge enhancement processing and the contrast enhancement processing upon the image capture signal at intensities based upon the MTF characteristic data. Since this is done, the body side control unit 103 is able to execute the edge enhancement processing and the contrast enhancement processing at optimum intensities for each interchangeable lens 200.

Embodiment 2

An interchangeable lens type camera system according to the second embodiment will be explained here. The interchangeable lens of this interchangeable lens type camera system transmits the MTF characteristic data to the camera body in the same manner as the first embodiment. However, the data form of the MTF characteristic data is different from the data form of the first embodiment shown in FIG. 4. The MTF characteristic data of the second embodiment will be explained hereinafter.

FIG. 5 is a figure showing the structure of the MTF characteristic data. In this embodiment, the MTF values 11 each are an actual MTF value of the imaging optical system 210 from 0.0 to 1.0.

The camera system according to the second embodiment as described above provides the same beneficial operational effects as the camera system according to the first embodiment.

The variations described below are also to be considered as being within the scope of the present invention, and one or a plurality of these variant embodiments may be combined with the embodiment described above.

Variant Embodiment #1

It would also be acceptable to arrange for the body side control unit 103 to perform only one of the edge enhancement processing and the contrast enhancement processing.

Variant Embodiment #2

It would also be acceptable to arrange for the interchangeable lens 200 not to be a lens whose focal length is variable, but to be a so called single-focal length lens. In this case, the first focal length and the second focal length would be treated as being the same focal length. In other words, the MTF value 11 corresponding to the first focal length, the MTF value 11 corresponding to the second focal length, and the MTF value 11 corresponding to the intermediate focal length, would all be the same value. That is to say, the MTF characteristic data 10 would have the same MTF value for each of these three focal lengths, since they would all be the same.

Variant Embodiment #3

In the first embodiment described above, the lens side control unit 203 only transmits the MTF characteristic data 10 once, during the initial communication process. However, it would also be acceptable to arrange for the lens side control unit 203 to transmit the MTF characteristic data 10 to the camera body 100 on the same cycle as the image output cycle of the image sensor 104. For example, since in the first embodiment described above the image output cycle of the image sensor 104 is sixty frames per second (i.e. about one frame every 16 milliseconds), it may be arranged for the lens side control unit 203 to transmit the MTF characteristic data 10 once every approximately 16 milliseconds. By arranging for the lens side control unit 203 to transmit the MTF characteristic data 10 periodically in this manner, it is possible to ensure that the camera system 1 functions correctly even if the MTF characteristics of the imaging optical system 210 change dynamically.

As an example of a camera system 1 in which the MTF characteristics of the imaging optical system 210 change dynamically, there may be cited a system in which an ND filter that can be set to ON or OFF in order to adjust the amount of light transmitted by the imaging optical system 210 is housed internally to the interchangeable lens 200. With this type of camera system, the MTF characteristic of the imaging optical system 201 changes according to whether the ND filter is ON or OFF. Thus, two sets of MTF characteristic data 10 would be stored in the ROM 215 corresponding respectively to the ND filter being ON and OFF, and the lens side control unit 203 would transmit a different set of MTF characteristic data 10, according to whether the ND filter is ON or OFF. Or it would also be acceptable for the lens side control unit 203 to perform some predetermined correction calculation upon the MTF characteristic data 10 if the ND filter is ON.

Another example of such a camera system 1 that may be cited is one in which the lens side control unit 203 is adapted to be able to detect that a filter has been fitted in front of the interchangeable lens 200, and to transmit different MTF characteristic data, depending upon the result of this detection.

Variant Embodiment #4

The three focal lengths 12 for which the MTF characteristic data 10 are defined may not always be limited to the focal length at the wide angle end of the zoom range of the interchangeable lens 200, the focal length at the telephoto end thereof, and a focal length value intermediate between these two, if the three focal lengths are different from each other. For example, if the interchangeable lens 200 is a zoom lens whose focal length is variable in the range 80 mm to 300 mm, then these three focal lengths 12 may be 120 mm, 180 mm, and 250. In addition, the three focal lengths 12 may include a focal length out of the zoom range. In this case, the MTF value 11 is a value calculated on the assumption of such a focal length.

The two F values 13 for which the MTF characteristic data 10 are defined may not always be limited to the maximum aperture F value of the imaging optical system 210 and an F value that is different from the maximum aperture F value, and may be an F value near the maximum aperture F value of the imaging optical system 210 and an F value that is different from that F value. For example, if the maximum aperture F value is F2, the two F values 13 may be F2.4 and F8. In addition, the two F values 13 may include an F value smaller (i.e. bigger aperture opening) than the maximum aperture F value and an F value bigger (i.e. smaller aperture opening) than the minimum aperture F value. In this case, the MTF values 11 are values calculated on the assumption of such F values.

As well as the focal lengths and the F values, the three image height positions for which the MTF characteristic data 10 are defined may not always be limited to a position in the neighborhood of the optical axis of the imaging optical system 210, a position at the edge of the photographic field (the end of the angle of view) of the imaging optical system 210, and a position intermediate between these two positions, if the three image height positions are different from each other. In addition, the position at the edge of the photographic field may be a position near the edge of the photographic field (the end of the angle of view) of the imaging optical system 210. And the four spatial frequencies 15 for which the MTF characteristic data 10 are defined may not be limited to 10 lines per mm, 20 lines per mm, 40 lines per mm, and 80 lines per mm, if the four spatial frequencies 15 are different from each other.

Since the MTF characteristic data 10 is configured above, it is possible to reduce the amount of data in the MTF characteristic data 10 while keeping the accuracy of the MTF characteristics sufficiently.

Variant Embodiment #5

The two F values of the MTF characteristic data 10 may not always be defined by F values. It may be possible to define them by an opening size (e.g. diameter) of the aperture 211, and a size (e.g. diameter) of exit pupil or entrance pupil of the imaging optical system 210. Since these values almost respectively correspond to F values, for example the aperture opening diameter 25 mm and the aperture opening diameter 4.5 mm may be used instead of F2 and F11.

The above described embodiments are examples, and various modifications can be made without departing from the scope of the invention.

What is claimed is:
1. An interchangeable lens, comprising:
   a fitting unit that can be fitted to and removed from a camera body;
   an imaging optical system that has an aperture, and whose focal length is variable over a range from a first focal length to a second focal length;
   a focusing lens;

a first transmission unit that transmits position information of the focusing lens to the camera body via a first transmission path; and a second transmission unit that transmits MTF characteristic data specifying MTF characteristics of the imaging optical system to the camera body via a second transmission path that is different from the first transmission path and is a full duplex transmission path, wherein:

the MTF characteristic data is a plurality of MTF values, each MTF value corresponding to a combination of (1) one of three focal lengths, (2) one of two aperture F values, and (3) one of three image height positions;

the three focal lengths are the first focal length, the second focal length, and a focal length intermediate between the first focal length and the second focal length;

the two F values are a maximum aperture F value of the imaging optical system and an F value other than the maximum aperture F value; and the three image height positions are a position in a neighborhood of an optical axis of the imaging optical system, a position at an edge of a photographic field of the imaging optical system, and an intermediate position between the position in the neighborhood of the optical axis and the position at the edge of the photographic field.

2. An interchangeable lens according to claim 1, wherein: the F value other than the maximum aperture F value is F11.

3. An interchangeable lens according to claim 1, wherein: the MTF characteristic data is a plurality of MTF values, each MTF value corresponding to a combination of (1) one of the three focal lengths, (2) one of the two F values, (3) one of the three image height positions, and (4) one of four spatial frequencies; and the four spatial frequencies are 10 lines per mm, 20 lines per mm, 40 lines per mm, and 80 lines per mm.

4. An interchangeable lens according to claim 1, wherein: the second transmission unit transmits the MTF characteristic data to the camera body on a cycle that corresponds to an image output cycle of an image sensor provided in the camera body.

5. An interchangeable lens according to claim 1, wherein: the first focal length and the second focal length are the same focal length; and the MTF characteristic data has the same MTF values for each of the three focal lengths.

6. An interchangeable lens, comprising:
a fitting unit that can be fitted to and removed from a camera body;
an imaging optical system that has an aperture;
a focusing lens;
a transmission unit that transmits position information of the focusing lens to the camera body via a first transmission path; and
an MTF characteristic transmission unit that transmits MTF characteristic data specifying MTF characteristics of the imaging optical system to the camera body via a second transmission path that is different from the first transmission path and is a full duplex transmission path, wherein:

the MTF characteristic data is a plurality of MTF values, each MTF value corresponding to a combination of (1) one of three focal lengths, (2) one of two aperture F values, and (3) one of three image height positions;

the two F values are a first F value near a maximum aperture F value of the imaging optical system and a second F value different from the first F value; and the three image height positions are different from each other.

7. An interchangeable lens according to claim 6, wherein: the imaging optical system is configured so that a focal length is variable; and the three focal lengths are different from each other.

8. An interchangeable lens according to claim 7, wherein: the imaging optical system is configured so that the focal length is variable over a range from a first focal length to a second focal length that is larger than the first focal length; and the three focal lengths are the first focal length, the second focal length, and a third focal length that is larger than the first focal length and smaller than the second focal length.

9. An interchangeable lens according to claim 6, wherein: the imaging optical system is configured so that a focal length is fixed to a predetermined focal length; and each of the three focal lengths is the predetermined focal length.

10. An interchangeable lens according to claim 6, wherein: the second F value is F11.

11. An interchangeable lens according to claim 6, wherein: two of the three image height positions are a position in a neighborhood of an optical axis of the imaging optical system and a position near an edge of a photographic field of the imaging optical system.

12. An interchangeable lens according to claim 6, wherein: the MTF characteristic transmission unit transmits the MTF characteristic data corresponding to a spatial frequencies of 10 lines per mm, the MTF characteristic data corresponding to a spatial frequencies of 20 lines per mm, the MTF characteristic data corresponding to a spatial frequencies of 40 lines per mm, and the MTF characteristic data corresponding to a spatial frequencies of 80 lines per mm, to the camera body.

13. An interchangeable lens according to claim 6, wherein: the MTF characteristic transmission unit transmits the MTF characteristic data to the camera body on a cycle that corresponds to an image output cycle of an image sensor provided in the camera body.

14. A camera body, comprising:
a fitting unit that an interchangeable lens according to claim 1 can be fitted to and removed from;
an MTF characteristic reception unit that receives the MTF characteristic data from the interchangeable lens;
an image-capturing unit that captures an image of a photographic subject and outputs an image capture signal; and
an image processing unit that performs at least one of edge enhancement processing and contrast enhancement processing upon the image capture signal, at an intensity based upon the MTF characteristic data.

* * * * *